Patented June 25, 1935

2,006,222

UNITED STATES PATENT OFFICE 2,006,222

TREATMENT OF PLATINUM CONTACT MASSES

Earl S. Ridler, Shaker Heights, Ohio, assignor to The Grasselli Chemical Company, Cleveland, Ohio, a corporation of Delaware No Drawing. Application June 22, 1933, Serial No. 677,174

5 Claims. (Cl. 23—238)

The present invention relates to the treatment of platinum contact masses as used in the manufacture of sulfuric acid to restore their activity and consists in treating the spent masses with formic acid.

Platinized contact masses for use in the contact process of manufacturing sulfuric acid consist commonly of finely divided platinum deposited on a more or less inert carrier such as asbestos, magnesium sulfate, diatomaceous earth, silica gel, etc. These masses do not have an indefinite economical activity and must from time to time be regenerated, or re-activated.

The regeneration process heretofore exclusively used, as far as I know, consists in removing the spent masses from the contact converter, screening out dust and scale, spraying the mass with a solution of aqua regia and then replacing the mass in the converter. The active period of such a regenerated mass becomes shorter and shorter between successive regenerations and it must finally be reworked to recover the platinum and a new mass installed in the converters.

I have found that by treatment of spent platinum contact masses with solutions of formic acid the activity of the masses is substantially restored and that so re-activated masses can be re-used successfully in the contact sulfuric acid process, and a longer economic life is obtained with a greater efficiency for a given contact mass compared with other processes of re-activation.

The formic acid can be used in aqueous, alcoholic or other volatile solvent, the concentration of the solution seems to be immaterial, though I prefer to use strong solutions which will more safely insure an even contact of the formic acid with the platinum, I can also use liquid formic acid directly, though for economical reasons I prefer to use solutions thereof. In the case of spent contact masses consisting of platinized asbestos, diatomaceous earth or other insoluble carrier, I immerse this in the formic acid solution, separate it from the solution and repack the converter with the so treated mass.

This treatment is also particularly applicable to the treatment of platinized magnesium sulfate granules or pellets where the solubility of the magnesium sulfate would interfere with the immersion of the mass in a formic acid solution. With such masses I simply spray a formic acid solution onto the mass until it is saturated. The mass is then directly returned to the converter and is ready for use.

The following is a description of a successful treatment of a spent magnesium sulfate contact mass.

When the converter has become sufficiently cool for it to be opened, the mass is removed and packed in air-tight steel containers. If it is convenient to segregate portions of the mass this may be done. The spent mass after screening to remove dust and scale is spread out in a shallow wooden box of any convenient size to a depth of two inches or less. Formic acid, preferably a 50% aqueous solution, is sprayed onto the mass by means of a glass spray gun and compressed air. When the top layer of the mass has become damp the mass is turned over with wooden rakes to expose a fresh surface and the spraying continued. Formic acid is added just short of saturation. This will amount to three to three and one-half liters of 50% formic acid per 100 pounds of contact mass. The sprayed mass is then preferably repacked in the contact converters at once. Operation of the converters may be commenced as soon thereafter as it is desired.

The present application is a continuation in part of my application Ser. No. 656,045 filed Feb. 9, 1933, and contains subject matter in common with my application Ser. No. 677,173 filed on even date herewith.

I claim:

1. The process of regenerating a spent platinized sulfuric acid contact mass which comprises treating said mass with formic acid.

2. The process of regenerating a spent platinized sulfuric acid contact mass which comprises treating said mass with a strong solution of formic acid.

3. The process of regenerating a spent platinized sulfuric acid contact mass which comprises treating said mass with an aqueous solution of formic acid.

4. The process of regenerating a spent platinized magnesium sulfate-sulfuric acid contact mass which comprises spraying onto said mass an aqueous solution of formic acid.

5. The process of regenerating a spent platinized-magnesium sulfate-sulfuric acid contact mass which comprises spraying onto said mass an aqueous solution of formic acid which contains about 50% formic acid.

EARL S. RIDLER.